United States Patent
Chen et al.

(10) Patent No.: US 8,649,831 B2
(45) Date of Patent: Feb. 11, 2014

(54) TYPE OF CELL PHONE DEVICE WITH A HIDDEN SUSPENDED MICROPHONE

(75) Inventors: Wei Chen, Shenzhen (CN); Hong Xi Xue, Shenzhen (CN)

(73) Assignee: TCL Tian Yi Mobile Communications (Shenzhen) Company Limited, Shenzhen (CN)

( * ) Notice: Subject to any disclaimer, the term of this patent is extended or adjusted under 35 U.S.C. 154(b) by 224 days.

(21) Appl. No.: 12/808,123

(22) PCT Filed: Apr. 9, 2009

(86) PCT No.: PCT/CN2009/071199
§ 371 (c)(1),
(2), (4) Date: Jun. 14, 2010

(87) PCT Pub. No.: WO2009/124502
PCT Pub. Date: Oct. 15, 2009

(65) Prior Publication Data
US 2010/0273541 A1    Oct. 28, 2010

(30) Foreign Application Priority Data

Apr. 10, 2008    (CN) .......................... 2008 1 0066468

(51) Int. Cl.
*H04M 1/00*    (2006.01)
(52) U.S. Cl.
USPC ................ 455/575.3; 455/575.1; 379/433.01; 379/433.03; 379/433.13

(58) Field of Classification Search
USPC .......... 455/575.1, 575.3; 379/433.01–433.03, 379/43.11–433.13
See application file for complete search history.

(56) References Cited

U.S. PATENT DOCUMENTS

| | | | |
|---|---|---|---|
| 7,599,720 B2 * | 10/2009 | Fujihara et al. | 455/575.1 |
| 7,797,025 B2 * | 9/2010 | Hawker et al. | 455/575.1 |
| 2002/0006809 A1 * | 1/2002 | Kubo et al. | 455/550 |

FOREIGN PATENT DOCUMENTS

CN        1681276 A    10/2005

\* cited by examiner

*Primary Examiner* — Wesley Kim
*Assistant Examiner* — Nam Huynh
(74) *Attorney, Agent, or Firm* — Shimokaji & Associates P.C.

(57) ABSTRACT

A mobile phone apparatus with a hiddenly suspended microphone is provided. The apparatus comprises a mobile phone body, on which a rotation component is deposed, wherein: a microphone pickup hole is provided on said mobile phone body, and within the mobile phone body, there is a microphone device in a position corresponding to the microphone pickup hole; said microphone pickup hole is deposed on the mobile phone body's inner wall at a place where the body engaged with the rotation component, and said microphone pickup hole is shielded by the rotation component. Since the microphone device is mounted on the mobile phone body's inner wall in a suspension manner and the microphone pickup hole is shielded by the rotation component, the apparatus is convenient for the user to hold during calling, while the integrality of the appearance and the good speech quality are ensured.

3 Claims, 2 Drawing Sheets

TYPE OF CELL PHONE DEVICE WITH A HIDDEN SUSPENDED MICROPHONE

TECHNICAL FIELD

The present invention relates to a type of terminal apparatus for wireless communication and in particular, it relates to a cell phone device with an improved structure for a microphone.

BACKGROUND TECHNOLOGY

With the progress and development in human electronics technology, mobile phones have become one of the indispensable types of terminal apparatus for wireless communication for communication among people at any place and time. China is an example. When the China Mobile Network was initially set up in 1987, mobile phones already changed the method of communication among people; ten years ago, China only had a total of 10 million mobile users, and many urban and township residents still mainly relied on the fixed phones of China Telecom for communication; after 2001, China's economy developed rapidly and the number of mobile phone users increased sharply. According to data from the Ministry of Information Industry of China, by early 2007, China already had 487.4 million cell phone users and the number is still developing and growing in leaps and bounds.

Nowadays, there are many cell phones with a variety of styles and functions, ranging from the flat panel and flip over phones of the early days to the current sliding phones. Regardless of which style of cell phone is used, most of the microphones are retained on the exposed surface of the cell phone at least in the form of a small hole, thus affecting the overall aesthetic look of the cell phone.

As shown in FIG. 1, the microphone of the existing technology is located near panel A of the cell phone and is very prone to be blocked by the user's face, thus causing the sound heard by the other party to become lower; when the microphone is located close to B, it is prone to impact by an air stream caused by speaking, generating a whistling sound and the small hole is also likely blocked by a finger of someone with a large hand, thus causing the sound heard by the other party to become weaker. A cell phone with a microphone designed at a location such as the foregoing is not easy to use.

Next, as shown in FIG. 1, when microphone is located near C, for the cell phone manufacturer, in order to seek an ultra thin design or for health reasons (here, this refers to the impact brought about by electromagnetic waves too close to brain cells), the manufacturer more often than not installs the antenna inside or close to the microphone at the bottom of the cell phone, instead of placing it on the top of the cell phone, as is the customary practice. Thus, the microphone may affect the performance of the antenna when it is working.

Thus, the existing technology still needs to be improved and developed.

SUMMARY OF THE INVENTION

The technical issue to be resolved by the present invention is to provide a type of cell phone device with a hidden suspended microphone, so that the cell phone has a consistent, overall aesthetic look that also ensures good speech quality; thus the cell phone has a stable signal transmission and reception performance when the network does not have any advantages.

The technical solution of the present invention is as follows:

A cell phone device with a hidden suspended microphone, comprising a cell phone body, on which a rotating component is deposed, wherein: a microphone pickup hole is provided on the cell phone body, and within the cell phone body, there is a microphone device in a position corresponding to the microphone pickup hole used to pick up external sounds; the microphone pickup hole is deposed on the cell phone body's inner wall at a place where the body is engaged with the rotating component, and the microphone pickup hole is shielded by the rotating component.

The aforementioned cell phone device includes the aforementioned rotating component configured as the rotating shaft of a flip over cell phone.

The aforementioned cell phone device includes the aforementioned microphone component placed on a microphone jacket; the microphone jacket is used to secure the aforementioned microphone component to the inner wall of the body of the aforementioned cell phone.

The aforementioned cell phone device includes the aforementioned microphone jacket secured to the inner wall of the body of the aforementioned cell phone with a fastener.

The aforementioned cell phone device includes the aforementioned microphone jacket secured to the inner wall of the body of the aforementioned cell phone by way of hot melt glue.

The aforementioned cell phone device includes the aforementioned microphone jacket secured to the inner wall of the body of the aforementioned cell phone by way of a screw.

A cell phone device with a hidden suspended microphone is provided by the present invention. Since the suspended microphone component is installed on the inner wall of the aforementioned cell phone, the pickup hole of the aforementioned microphone is shielded by a rotating component, thus guaranteeing the overall aesthetic look of the cell phone, facilitating hand held operations of the user and guaranteeing good quality of a phone conversation; at the same time, its design keeps the pickup hole away from the antenna and facilitates production by the designer and manufacturer of the cell phone of a new style of green and ultra thin cell phone with good transmission and reception signals.

SPECIFIC EMBODIMENTS

In light of the drawings, the following is a more detailed description of the preferred embodiments of the present invention.

The cell phone device with a hidden suspended microphone in the present invention has a major improvement in the structure of the placement of the microphone in the cell phone. Other parts of the cell phone are known in the existing technology and will not be described here.

Figure 1:
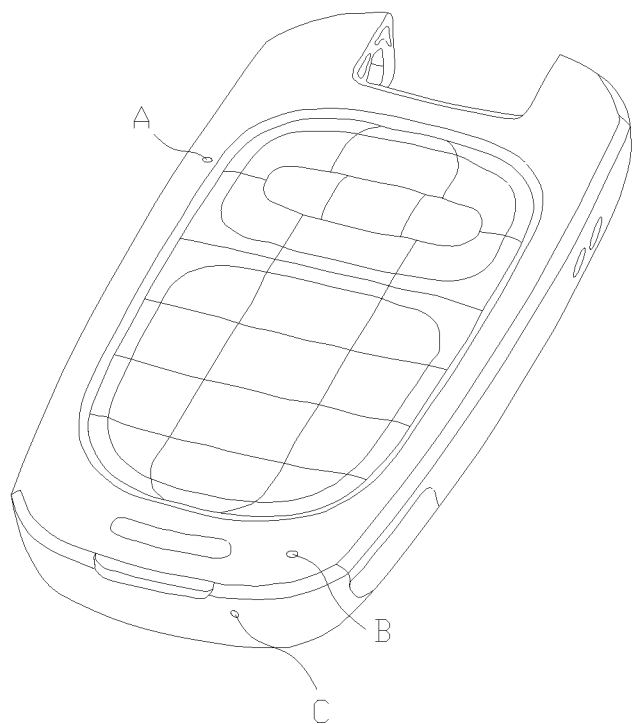
FIG. 1 is a schematic of the location of the cell phone microphone in the existing technology.
Figure 2:
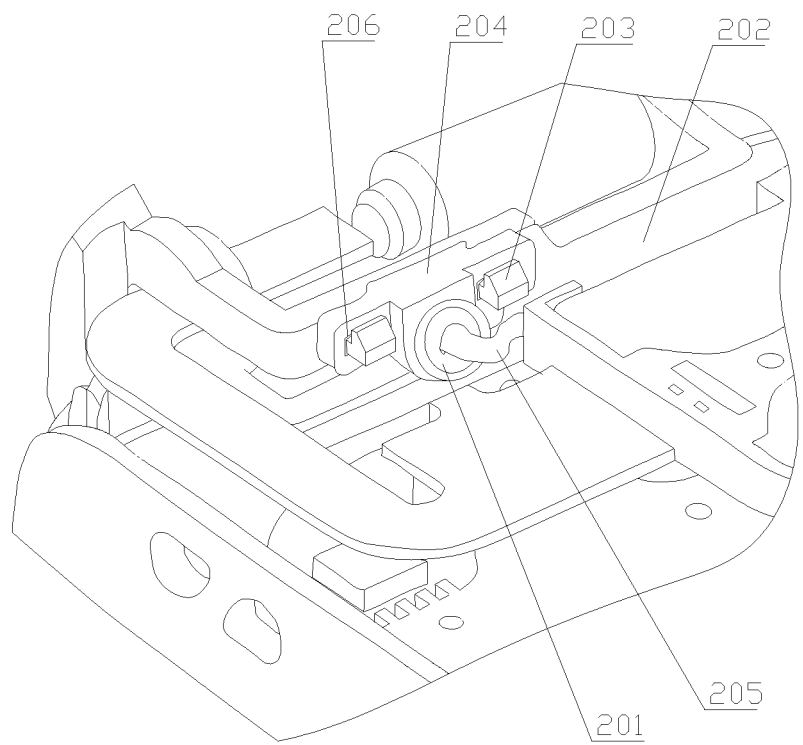
FIG. 2 is a schematic of the structure of the location of the cell phone microphone in the present invention after its disassembly.
Figure 3:
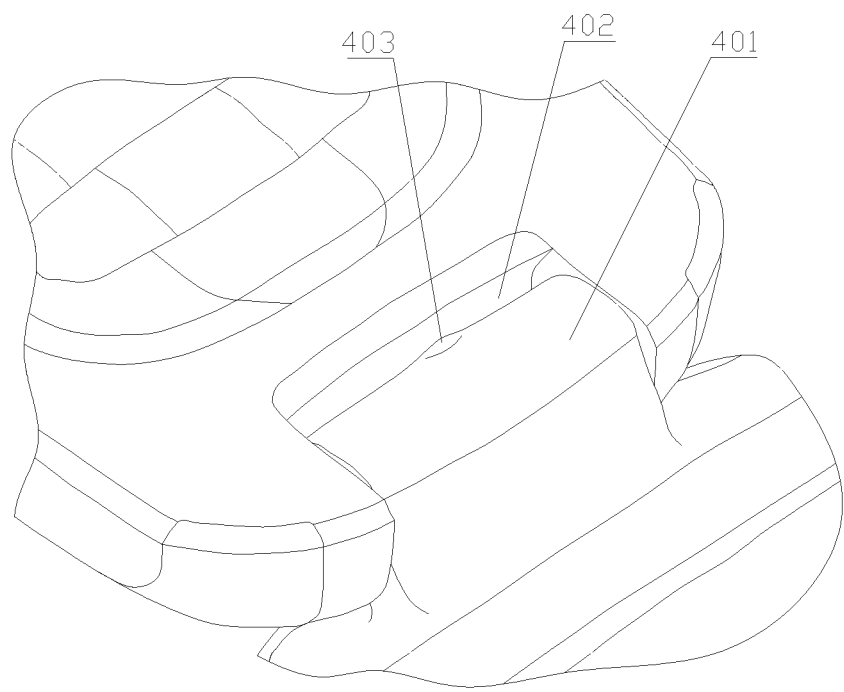
FIG. 3 is a schematic of the structure of the location of the cell phone microphone in the present invention after removal of its flip cover.
Figure 4:
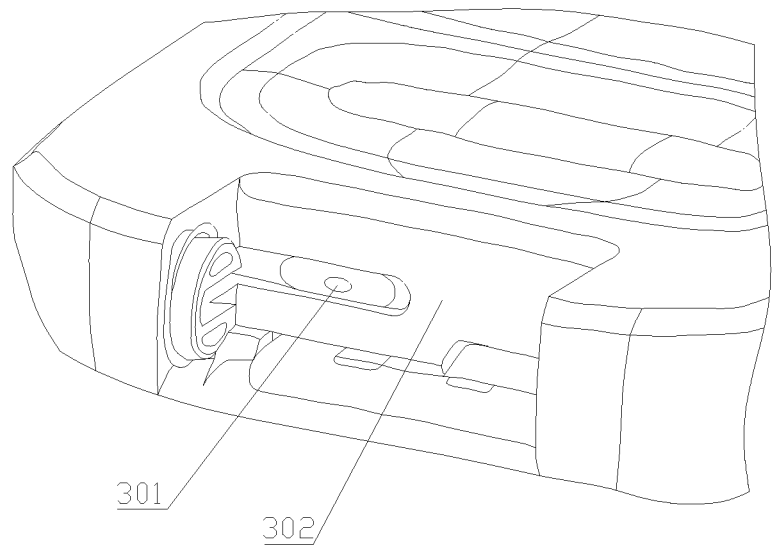
FIG. 4 is a schematic of the structure of the location of the rotating shaft of the cell phone in the present invention when the flip cover is opened.

In the cell phone device with a hidden suspended microphone in the present invention, there is a microphone device in a position corresponding to the microphone pickup, comprising a microphone component and a microphone jacket. The aforementioned microphone jacket can be made of hard plastic materials such as PP, ABS and PC, etc., through a molding tool, and preferredly can also be made of elastic rubbers such as PVC and silicon, etc., through a molding tool. As shown in FIG. 2, the aforementioned microphone component 201 is slid into the aforementioned microphone jacket 204. They are both suspended and installed on the inner wall 202 of the main body of the cell phone. As shown in FIG. 3, the aforementioned microphone pickup hole 301 that corresponds to them is located on the outer side 302 of the main body and can be designed into various shapes such as round, oval, a long circle, square and a star shape. As shown in FIG. 4, the aforementioned microphone pickup hole can be shielded by the cell phone rotating component 401.

The aforementioned cell phone rotating component refers to the rotating shaft of the cell phone flip cover or the rotating shaft parts of the cell phone video cam, cell phone flashlight or other functional components of a cell phone.

Take a flip over cell phone as an example, as shown in FIG. 4, due to the need for rotation movements, a certain activity clearance 202 must be reserved for the aforementioned flip cover between its rotating shaft and the main body of the cell phone. The size and range of such a clearance is generally between 0.3 and 1.0 mm If it is too large, the overall aesthetic look of the cell phone will be affected; if it is too small, then the flip cover will not rotate flexibly. During a phone conversation, sound may reach the aforementioned microphone component via the aforementioned clearance and the microphone pickup hole.

As shown in FIG. 4, a protruding platform 403 can also be designed for the flip shaft part corresponding to the aforementioned microphone pickup hole or an eccentric design can also be used for the flip shaft part, so as to facilitate further sealing of the aforementioned microphone pickup hole, in order to prevent clogging of the aforementioned microphone pickup hole due to entry of debris and dust when affected by static and when the aforementioned flip over cell phone is placed in a pocket or exposed outdoors for a long time, thus affecting speech quality.

Inside the main body of the cell phone corresponding to the aforementioned microphone pickup hole, the aforementioned microphone jacket can also fasten the aforementioned microphone component to the inner wall of the main body of the cell phone by suspension through the following methods:

1. Fastening by a fastener:

As shown in FIG. 2, the aforementioned microphone jacket 204 is made of a silicon gel material and is shaped through hot molding. The aforementioned microphone component 201 can be put into the stepped through hole in the center of the aforementioned microphone jacket 204. The side of the aforementioned microphone component with welding spots is flush against the inner side of stepped through hole in the center of the aforementioned microphone jacket. An inner lead 205 may traverse the aforementioned stepped through hole; on each of the two sides of stepped through hole in the center of the aforementioned microphone jacket, there is a square through hole 206, whose size and location match two protruding fasteners 203 made on and corresponding to the inner wall of the aforementioned cell phone main body; the aforementioned microphone jacket is installed inside the aforementioned cell phone main body. The aforementioned protruding fastener pushes the aforementioned microphone jacket tightly against the inner wall 202 of the aforementioned cell phone main body. The stepped surfaces of the aforementioned two fasteners dependably fasten the aforementioned microphone jacket. They are located on the side of the microphone jacket of the microphone pickup hole, and can be lower than the outer surface of the aforementioned cell phone main body or partially level with the outer surface of the aforementioned cell phone main body. But if they are higher than the outer surface of the aforementioned cell phone main body, it may affect the rotating movement of the aforementioned flip cover.

2. Fastening by hot melt gel:

There is a round through hole on each of the two sides of the stepped through hole in the center of the aforementioned microphone jacket. Its size and location match two round columns or round platforms made on and corresponding to the inner wall of the aforementioned cell phone main body; the height of the aforementioned round columns or round platforms is higher than the end surfaces of the aforementioned round through holes by 0.2 to 2 mm; install the aforementioned microphone jacket inside the aforementioned cell phone main body and iron and melt the aforementioned round columns or round platforms with a tool such as an electric iron, etc. Install the aforementioned microphone jacket dependably inside the aforementioned cell phone main body. Preferably, the microphone jacket is made of an ABS or PC material and is injection molded.

3. The screw fastening method:

There is a round through hole on each of the two sides of the stepped through hole in the center of the aforementioned microphone jacket. Its size and location match two protruding screw pins made on and corresponding to the inner wall of the aforementioned cell phone main body; The height of the aforementioned screw pins is lower than the aforementioned end surfaces of the aforementioned round through holes by 0.2 to 0 5 mm; install the aforementioned microphone jacket inside the aforementioned cell phone main body and use a screw driver to screw a screw with a washer into the aforementioned screw pin. Fasten the aforementioned microphone jacket dependably inside the inner wall of the aforementioned cell phone. Preferably, the microphone jacket is made of an ABS or PC material and is injection molded.

4. Ultrasonic welding method:

The aforementioned microphone jacket is made of a plastic material such as ABS or PC, etc. and is injection molded. An ultrasonic melting line is designed on its side that is flush against the aforementioned cell phone main body; install the aforementioned microphone jacket inside the aforementioned cell phone main body and use an ultrasonic apparatus and special positioning clamp to dependably fasten the microphone jacket to the inside wall of the aforementioned cell phone main body.

The cell phone device with a hidden suspended microphone described in the embodiments of the present invention installs its microphone component by using a suspension method. Its structure is simple and compact, thus taking up little space inside the cell phone. The rotating shaft of the cell phone is also used to shield the microphone, thus perfectly guaranteeing the overall effect and aesthetic look of the external design of the cell phone; at the same time, this prevents the user from unwittingly blocking the microphone pickup hole, thus causing the sound heard by the other party to become lower; more rarely, such a structural design far away from the cell phone antenna enables the designer to develop a cell phone product with more stable transmission and reception signals, a thinner main body and a lower radiation to the human brain.

It should be understood that an ordinary technician in this field can make improvements or changes based on the above description, such as the location of the rotating shaft used to shield the microphone pickup hole on the left side or right side of the cell phone main body and designing the microphone pickup hole and microphone component on the rotating shaft of the cell phone. All such improvements and changes fall into the scope of protection of the claims of the present invention.

The invention claimed is:

1. A cell phone device with a hidden suspended microphone, comprising:
    a cell phone main body;
    a rotating component being disposed on the cell phone main body;
    a microphone pickup hole being disposed on the cell phone body, wherein a microphone pickup hole wall protrudes outwardly from the exterior of the cell phone body;
    within the cell phone body, there being a microphone device in a position corresponding to the microphone pickup hole being used to pick up external sounds,
    wherein the microphone device is hidden from a user in an enclosed jacket and suspended above a lower portion of the cell phone body, and
    wherein the jacket is securely attached to multiple sides of an inner wall of the cell phone main body by multiple protruding fasteners and suspended from the lower portion of the cell phone body; and
    the microphone pickup hole being disposed on the cell phone main body inner wall at a place where the main body is engaged with the rotating component, and said microphone pickup hole is shielded by said rotating component.

2. The cell phone device according to claim 1, wherein the rotating component is configured as a flip shaft and the cell phone device is a flip over cell phone.

3. The cell phone device according to claim 1, wherein said enclosed jacket is secured to the inner wall of the cell phone main body with a screw.

* * * * *